United States Patent [19]

Arruda

[11] 4,114,660

[45] Sep. 19, 1978

[54] AUTOMOBILE OIL CHANGING DEVICE

[76] Inventor: Michael Arruda, 144 Pleasant St., Rehoboth, Mass. 02769

[21] Appl. No.: 788,604

[22] Filed: Apr. 18, 1977

[51] Int. Cl.$^2$ ................... B65B 39/00; B67C 11/04
[52] U.S. Cl. ........................... 141/98; 141/339; 184/106; 220/1 C; 312/228
[58] Field of Search .................... 141/98, 313–317, 141/331–345, 376, 379, 380, 381; 184/1.5, 106; 206/223; 220/1 C, DIG. 5; 312/228, 229, 285

[56] References Cited

U.S. PATENT DOCUMENTS

| | | | |
|---|---|---|---|
| 192,348 | 6/1977 | Preston | 141/341 X |
| 1,134,837 | 4/1915 | Fox | 141/331 X |
| 1,528,095 | 3/1925 | Bredar | 184/106 X |
| 3,335,769 | 8/1967 | Ilg | 141/340 |
| 3,579,652 | 5/1971 | Ericson | 141/337 X |

*Primary Examiner*—Richard E. Aegerter
*Assistant Examiner*—Frederick R. Schmidt
*Attorney, Agent, or Firm*—Robert J. Doherty

[57] ABSTRACT

A device for the convenient collection and disposal of liquids and particularly liquids such as automobile waste oil is disclosed. The device includes a receptacle comprising a bottom wall and peripheral side walls defining in part an open central portion having a downwardly inwardly extending funnel-shaped central wall adapted for initial receipt of such liquid. The funnel terminates in a valved conduit which projects beneath the bottom wall of the receptacle so as to conveniently provide access for containers and the like into which the waste oil may then be directed. A detachable cover adapted to enclose the open central portion of the receptacle is provided so that when the cover is in place the receptacle may be used for the temporary storage and transportation of such waste oil in a convenient and clean manner.

6 Claims, 6 Drawing Figures

AUTOMOBILE OIL CHANGING DEVICE

BACKGROUND OF THE INVENTION

Various devices are known and/or are available for the assistance in draining liquids from machines such as the waste oil from an automobile engine. Specifically this procedure generally involves the placement of a container beneath the crankcase of the automobile, thereafter opening the crankcase closure plug thereof to permit oil to drain into the container which either is then utilized to directly dispose of the waste oil or from which the oil is thereafter directed to a subsequent container for later disposal. This is often and generally considered a messy and unpleasant task and accordingly improvements in the manner or equipment utilized for such purpose would be particularly desirable and are generally sought.

The following patents represent prior art attempts in facilitating such purpose and their citation and discussion herein constitute applicant's prior art statement. In such regard a copy of each such patent is submitted with the subject application. U.S. Pat. No. 3,169,605 issued Feb. 16, 1965 is directed to an automobile oil drip catcher which has particularly utility for direct connection to under portions of the automobile engine wherein oil dripping therefrom is received within a receptacle having a continuously open discharge spout. When the engine is idling or the automobile is moving at low speeds, air pressure within the receptacle is low and accordingly oil is retained therein. However, the receptacle is provided with a rather large front opening so that when the vehicle is under way, air pressure builds up within the receptacle and forces oil out the open tube. U.S. Pat. No. 3,308,840, issued Mar. 14, 1967, discloses a funnel and a separate container adapted to receive oil from an automobile crankcase. The funnel is vertically adjustable with respect to the container and further includes means for directing a flushing liquid into the crankcase. U.S. Pat. RE No. 27,449, issued Aug. 1, 1972, is directed to a container having a funnel-shaped upper portion disposed in proximate abutting relationship to one end panel thereof. The base of the funnel terminates into interior portions of the receptacle. Suitable closures, both for the funnel portion and a discharge opening, as well as a handle are provided.

SUMMARY OF THE INVENTION

The present invention provides a device in the form of a receptacle having peripheral side walls and a bottom wall in part defining a generally central open portion having a downwardy inwardly extending funnel shaped central wall. The receptacle is further provided with adjustable legs so as to enable the positioning of such in relationship to containers adapted to receive liquid poured into the funnel-like central wall. A cover separable from the receptacle is also provided for positioning under the crankcase of an automobile to receive the waste oil and thereafter utilized to pour such oil into the receptacle and subsequent direction thereby into the containers. The containers may thereafter be stored until it is convenient to dispose of them. A valve is provided so that oil can be temporarily held within the receptacle and the flow outwardly directed therefrom controlled and so the receptacle will not continue to drip oil from the bottom of the central wall between uses of the device and so that it may be conveniently and cleanly stored for instance in one's garage or automobile trunk.

It is accordingly a primary object of the present invention to provide a device which may be utilized for the convenient collection and disposal of liquids such as automobile waste oil from the crankcase thereof so that oil received thereby may be conveniently directed to disposal containers positioned thereunder.

A further object of the present invention is the provision of a device of the immediately aforementioned type wherein those areas thereof coming in contact with oil may be exteriorly sealed immediately after use so as to provide an external cleanliness thereof and permit its storage in those areas normally reserved for household articles and the like.

A still further object of the present invention is the provision of a device of the immediately aforementioned type in which its positioning with respect to containers to be filled is conveniently adjustable so as to accommodate varying dispoal container heights.

Still another object of the present invention is the provision of a device of the immediately aforementioned type in which the receptacle body not only provides a convenient mechanism for the collection and disposal of waste oil but furthermore provides for the similar convenient storage of articles normally associated with oil drainage tasks such as cleaning rags and the like.

Other objects, features and advantages of the invention shall become apparent as the description thereof proceeds when considered in connection with the accompanying illustrative drawing.

DESCRIPTION OF THE DRAWING

In the drawing which illustrates the best mode presently contemplated for carrying out the present invention.

DESCRIPTION OF THE INVENTION

Figure 1:
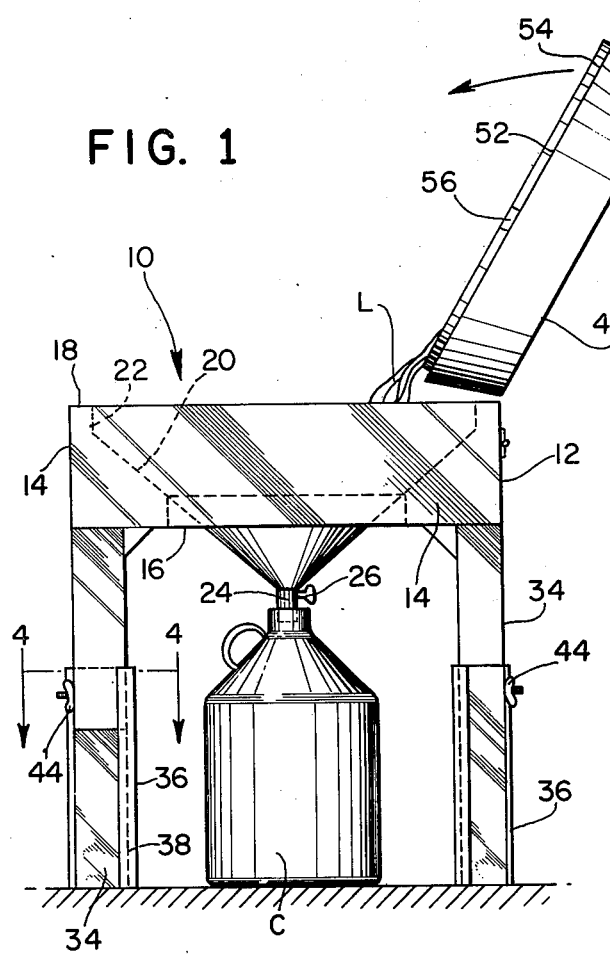
FIG. 1 is a side elevational view of the device of the present invention shown in extended use position as when receiving oil from the cover or collector portion thereof.

Turning now to the drawing and particularly FIG. 1 thereof, the overall manner in which the device 10 of the present invention is utilized is best shown. Such device includes a receptacle 12 defining a generally closed body and including a plurality of peripheral side walls 14, a bottom wall 16 and an abbreviated top wall 18 which in turn is inwardly radially directed from peripheral portions of the side walls 12 and terminates in a central wall 20 of generally funnel-like configuration. The central wall further includes an upstanding collar or upper portion 22. The center of the bottom wall 16 is in effect a continuation of the central wall 20 which extends therebelow and terminates in a tube or other conduit 24 having a closure valve 26 mounted therein and operable to permit the liquid directed to the central wall 20 of the container to be alternatively retained therein or directed therefrom. The central wall 20 is further provided with spaced volume delineations both in quarts and liters so that the amount of oil drained from the engine may be readily measured as will hereinafter be more apparent.

Figure 2:
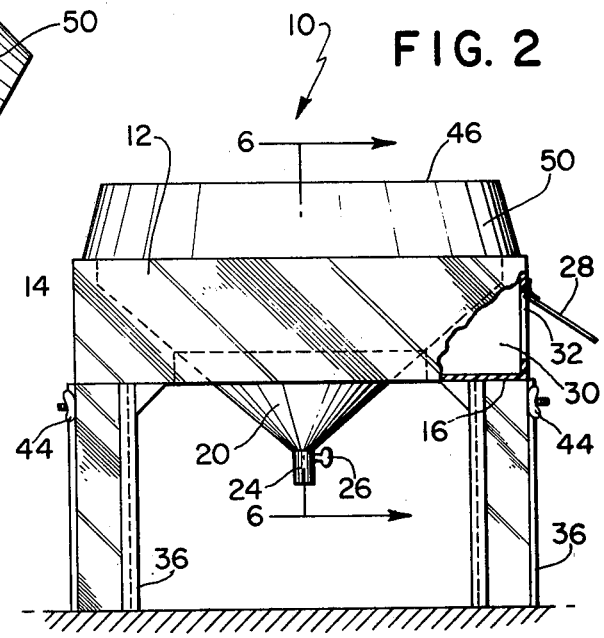
FIG. 2 is a side elevational view of the container shown in FIG. 1 in retracted or closed position and with parts broken away to better illustrate a subsidiary storage compartment in the body thereof.

Also by particular reference to FIG. 2 of the drawing, it may be apparent that the bottom wall 20, the side walls 14 and the bottom wall 16 cooperatively define a generally hollow receptacle interior adjacent and outwardly disposed from the central wall 20 thereof. At one or more locations in the side walls 14 thereof, an outwardly hinged door 28 may be provided so as to in part define and communicate with a chamber 30 through an opening 32 so that tools normally associated with automobile oil changing tasks such as cleaning rags, can openers, wrenches and the like may be conveniently stored therein for transport without danger of oil, dirt and the like often found on such tools from contacting objects or persons when the device is not being actively utilized.

Figure 4:
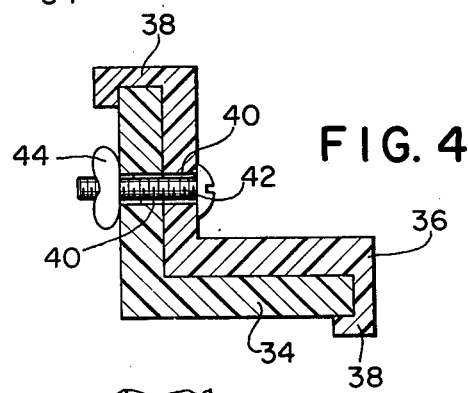
FIG. 4 is a cross-sectional view taken along the line 4—4 of FIG. 1.
Figure 3:
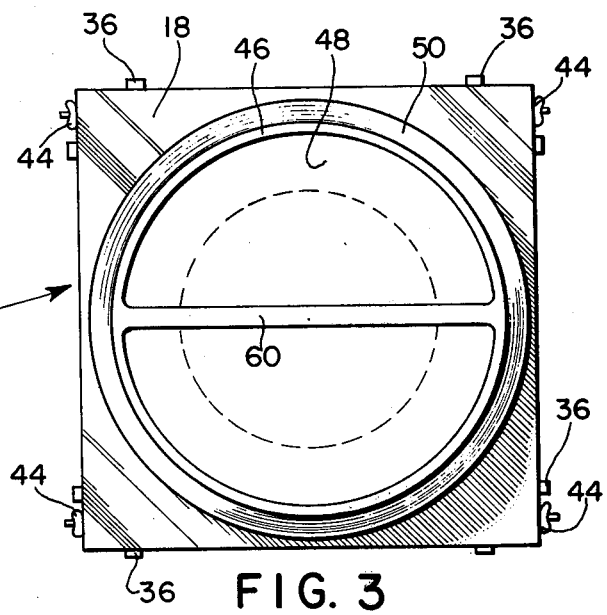
FIG. 3 is a top plan view of the device shown in FIG. 2.
Figure 5:
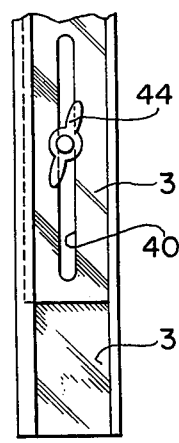
FIG. 5 is a partial elevational view showing in particular the manner in which the leg and leg extension are slidably joined to each other.
Figure 6:
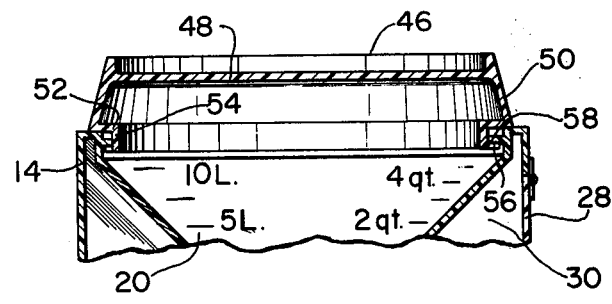
FIG. 6 is a partial sectional view taken along the line 6—6 of FIG. 2.

A plurality of legs 34, i.e., each downwardly extending from the four corners of the receptacle 12, are provided in order to raise the receptacle with regard to containers C adapted to be positioned therebeneath. The legs, of course, further provide a suitable support for the device. As best seen from simultaneous reference to FIGS. 4 and 5, the cross-sectional configuration of the legs 34 and leg extensions 36 is generally L-shaped, the extensions further being provided with U-shaped portions or flanges 38 which serve to envelop exterior side wall portions of the legs 34. Also, one of the walls of the leg 34 and leg extension 36 which are positioned in face-to-face contact with each other are provided with elongated slots 40. The slots 40 are also adapted for alignment with each other so as to receive a bolt 42 therethrough. The threaded end of such bolt extends outwardly of the leg 34 and in turn is adapted to receive clamping means such as the wing nut 44. Accordingly tightening of the wing nut 44 enables the slidable leg extension 36 to be firmly positioned with respect to the leg 34 and thus enable positioning of the receptacle 12 at varying heights. Each of the wing nuts 44 are positioned outwardly, that is, against the leg 34 in the embodiment shown so as to be readily accessible for tightening and untightening.

The manner in which the device of the present invention is primarily utilized is best illustrated in FIG. 1. There, liquid L such as waste automobile crankcase oil is poured into the central wall of the receptacle by a cover member 46 specially adapted for this purpose and accordingly of relatively low height so as to facilitate placement beneath an automobile crankcase. After positioning a container C beneath the conduit 24, the valve 26 is opened wherein oil will directed into the container. Alternatively the valve may be left open so that oil received by the central wall 20 immediately passes into the container, however in the former case the amount of oil can be measured by observing the volume delineations previously indicated. When the container is full or no more oil from the cover 46 is available, the valve 26 is closed whereupon the container may be stoppered and conveniently disposed of either immediately or at some later time, it being clear that the container forms a convenient temporary or permanent storage therefor. The legs 34 may then be telescoped to the closed position such as shown in FIG. 2, the tools utilized in the oil changing or draining procedure stored within the chamber 30 and the device itself temporarily stored in a convenient location until needed at a later date. In order that the storage of the device will not result in soiling of the garage, workshop or automobile trunk in which such is temporarily stored, the pan 46 is specifically designed so as to form a cover for the receptacle 12.

The cover 46 is generally of circular configuration having a top wall 48 and upstanding side walls 50 which are preferably outwardly flared for convenience in pouring and terminate in a peripheral edge 52 from which a circular flange 54 projects. The flange 54 is provided at at least two spaced locations, with outwardly extending lugs 56 adapted to, upon relative rotation of such cover 46 with respect to the receptacle 12, to slide beneath inwardly directed ridges or extensions 58 provided on the upstanding or collar portion 22 of the central wall 20. Other rotationally actuated connection means such as screw threads could alternatively be utilized. The top wall 48 of the cover is provided with a transversely extending upwardly projecting bar 60 for convenient grasping to effect such rotation.

It may thus be seen that after the receptacle has been utilized to direct waste oil to the temporary or permanent container thereof, the valve 26 thereof may be closed and the cover 46 sealingly engaged thereto as above described, so that the inevitably remaining quantities of oil on the surface of the central wall 20 will not be free to soil the storage areas in which the device is placed. In other words, a device which after use would normally be separately stored or require special protection so as to not soil articles or the area coming in contact therewith may be conveniently stored without such special preparation.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A device for the convenient collection and disposal of liquids such as automobile waste oil comprising a generally rectangular receptacle having a bottom wall and peripheral side walls, a downwardly inwardly extending funnel-shaped central wall for receipt of liquid thereon, said central wall having an open top and projecting through said bottom wall and terminating in a downwardly extending conduit for directing said liquid from said central wall outwardly of said receptacle as to containers adapted for placement therebeneath, said side walls, said bottom wall and said central wall cooperatively forming a hollow enclosed storage chamber surrounding said central wall and disposed within said receptacle, means opening through one of said side walls providing access to said chamber, said conduit including valve means for controlling the flow of said liquid through said conduit, said receptacle further including a detachable cover positioned over and adapted to close said open top, said cover contacting upper portions of said central wall in liquid sealing relationship thereto so that liquid may be temporarily transported in said receptacle and means for positioning said receptacle for receipt of containers beneath said conduit, said positioning means including vertically adjustable legs downwardly extending from said bottom wall, said conduit terminating above the uppermost possible position of said legs such that said conduit is displaced from a supporting surface for said legs, said legs each having a removable extension attached thereto, said legs and extensions slidably nested and means for maintaining the relative positioning of said legs and said extensions.

2. The device set forth in claim 1, said conduit being a tube projecting below said bottom wall and said flow control means being a valve mounted in said tube, said tube and valve readily accessible for manipulation by means of relatively wide open areas defined between said legs and below said bottom wall.

3. The device set forth in claim 1, said receptacle including a top wall inwardly extending from said side walls and terminating with peripheral upper portions of said central wall, said cover having a bottom wall and a peripheral flange downwardly extending therefrom, said flange adapted to sealingly engage with said upper central wall portions.

4. The device set forth in claim 3, said flange and said upper central wall portions having cooperating locking means whereby relative rotation of said cover with respect to said receptacle sealingly closes said receptacle.

5. The device as set forth in claim 4, said locking means being a bayonet type wherein said cover includes a pair of spaced lugs adapted to underlie projections inwardly extending from said upper central wall portions upon said relative rotation.

6. The device set forth in claim 1, said cover adapted for placement beneath the oil pan of an automobile for initial receipt of waste oil removed therefrom and for subsequent placement in said central wall of said receptacle.

* * * * *